United States Patent
Verma

(10) Patent No.: US 12,400,208 B2
(45) Date of Patent: Aug. 26, 2025

(54) MULTI-PART SINGLE QR CODE FOR SPLIT TRANSACTIONS

(71) Applicant: Bank of America Corporation, Charlotte, NC (US)

(72) Inventor: Sandeep Verma, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 237 days.

(21) Appl. No.: 18/241,281

(22) Filed: Sep. 1, 2023

(65) Prior Publication Data

US 2025/0078061 A1 Mar. 6, 2025

(51) Int. Cl.
*G06Q 20/22* (2012.01)
*G06K 19/06* (2006.01)
*G06Q 20/32* (2012.01)

(52) U.S. Cl.
CPC ..... *G06Q 20/227* (2013.01); *G06K 19/06037* (2013.01); *G06Q 20/3276* (2013.01)

(58) Field of Classification Search
CPC ............. G06Q 20/227; G06Q 20/3276; G06K 19/06037
See application file for complete search history.

(56) References Cited

U.S. PATENT DOCUMENTS

| | | | |
|---|---|---|---|
| 9,875,469 B1 | 1/2018 | Chin et al. | |
| 10,579,975 B2 | 3/2020 | Coffman et al. | |
| 11,195,156 B2 | 12/2021 | Ham | |
| 2021/0406868 A1* | 12/2021 | Brightman | G06K 19/06037 |
| 2024/0232833 A1* | 7/2024 | Ryan | G06Q 20/326 |

* cited by examiner

*Primary Examiner* — Scott S Trotter
(74) *Attorney, Agent, or Firm* — Weiss & Arons LLP

(57) ABSTRACT

Provided herein is a method for processing a split transaction, including generating or accessing an MPQR code, enumerating the transactors, assigning a split payment amount to each transactor, displaying the MPQR code in a scannable location, scanning the MPQR code by a mobile computing device of each transactor, generating a personalized visual representation of the MPQR code for each transactor and displaying it on their mobile devices with a hyperlink to that transactor's payment processing site, debiting the split payment from each transactor, holding in escrow the split payments until the transactors collectively remit the total transaction amount, and, after the transactors have collectively remitted the total transaction amount, transferring the split payments to the merchant.

20 Claims, 6 Drawing Sheets

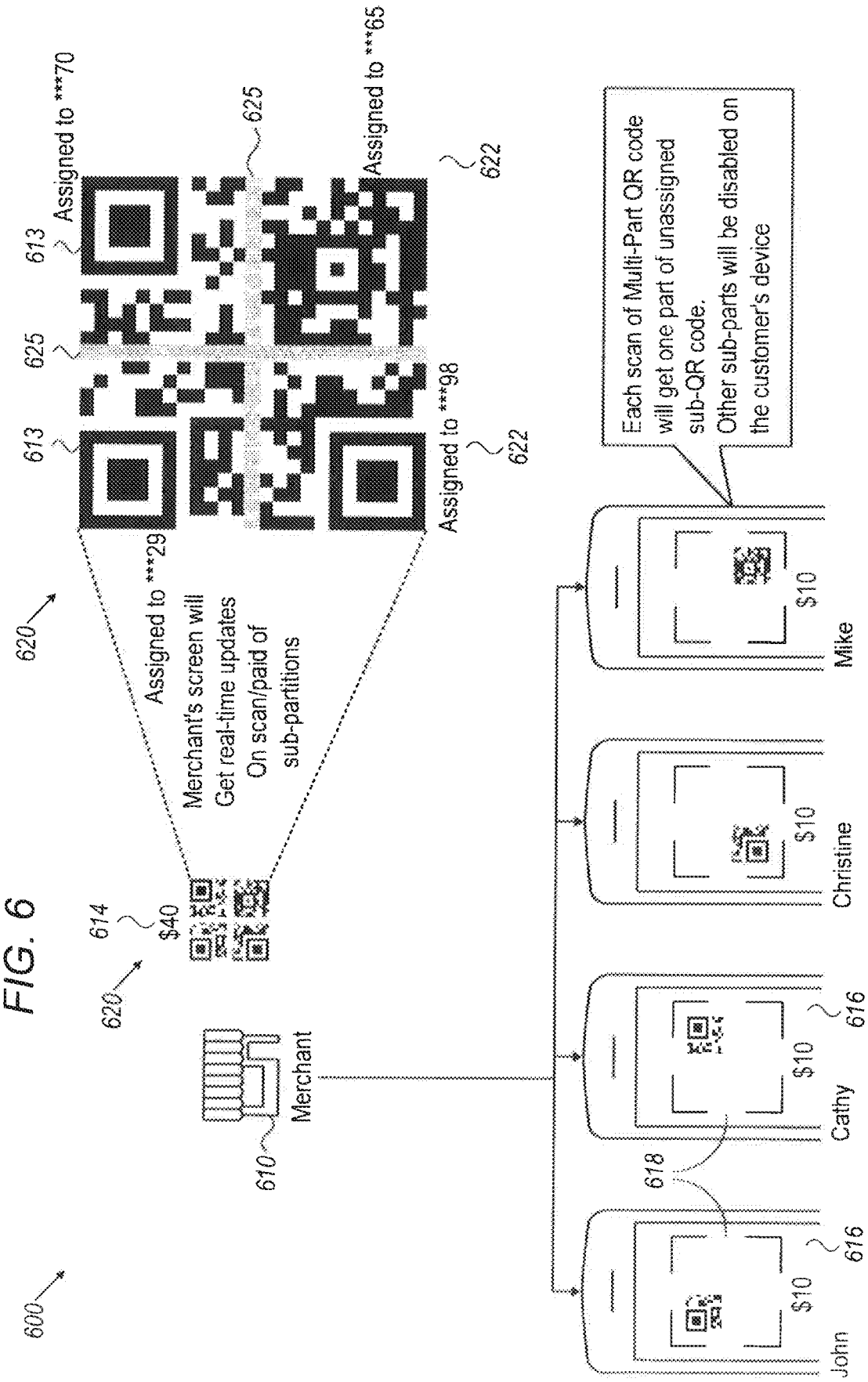

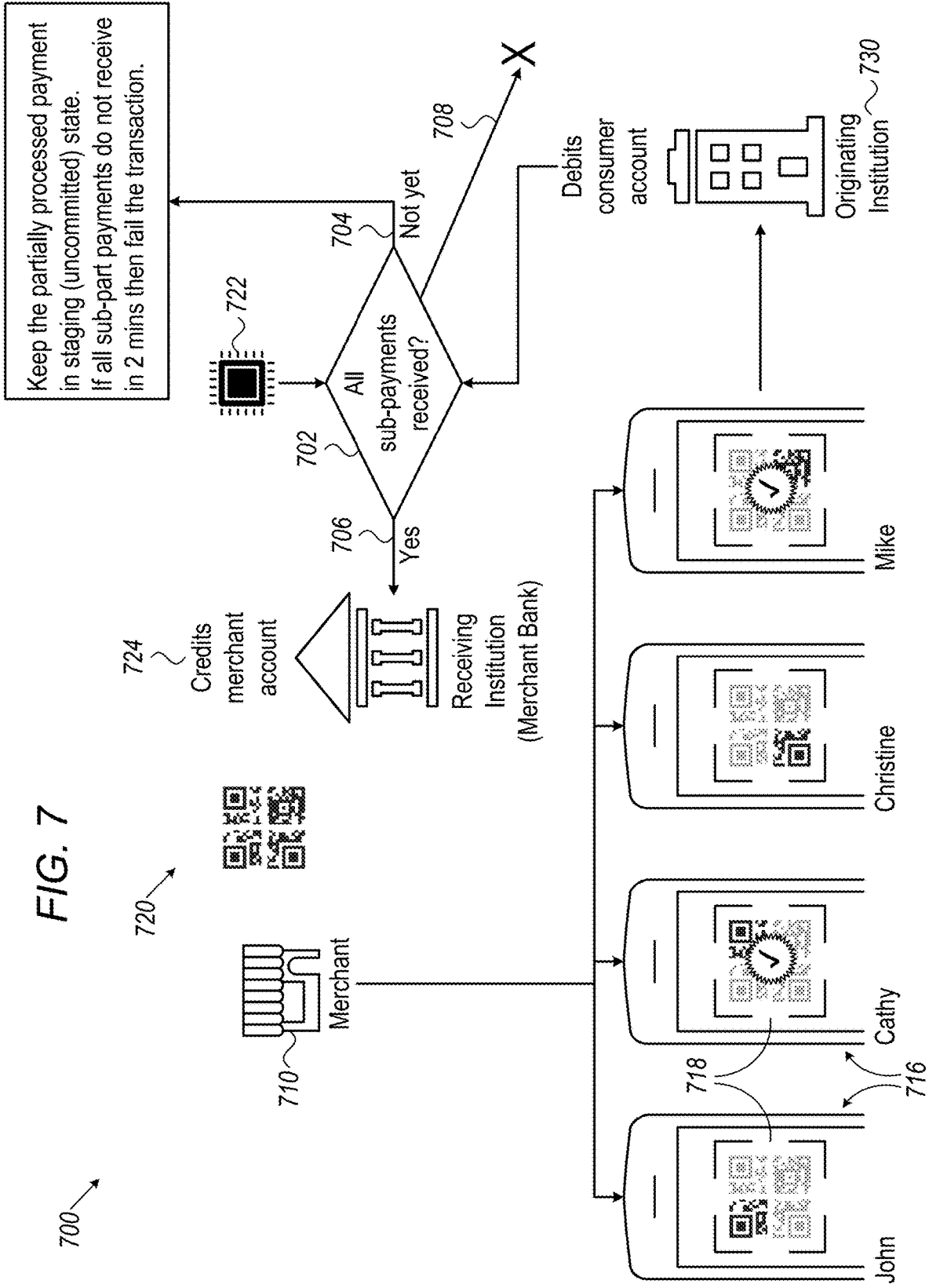

MULTI-PART SINGLE QR CODE FOR SPLIT TRANSACTIONS

FIELD OF TECHNOLOGY

Aspects of the disclosure relate to methods and systems for processing split payments.

BACKGROUND OF THE DISCLOSURE

Merchant Presented QR (MPQR) technologies enable a merchant to generate a unique QR code that is used to collect a payment from a consumer. The consumer scans the merchant QR code and uses it to authenticate themselves and transfer the funds into the merchant's bank account or financial institution. QR code-based payment technologies are suitable for use by a single payer per payment request. Typically, they can be used by a single payer per QR code.

Such systems are not designed for split transactions, for example where a single QR code is used to represent an invoice that is payable in a divided fashion by multiple consumers and/or entities. Standard MPQR technologies are not capable of splitting a single invoice among several users. If an invoice is requested to be split, the merchant may need to generate a separate payment code for each consumer. Doing so may complicate efforts to efficiently verify that the payment was made in full.

Another complication can arise if some users are unable to pay their share of a split charge. This complication may not be realized until after one or more payers have already submitted their payment(s). The merchant may then have to manually refund funds remitted by individual users whose payments were already processed.

SUMMARY OF THE DISCLOSURE

It is an object of this invention to automatically generate a visual representation of the payment progress of split transactions. Such a technology would be beneficial to both payers and merchants.

It is a further object of this invention to monitor the status of split transactions and eliminate the need to manually refund partial payments of split transactions in cases where the transaction is not fully remitted by the payers.

It is a further object of this invention to provide a visually user-friendly representation of payer participation and payment status for split transactions.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically generate a merchant presented quick response (MPQR) code, associate a code with a split transaction, and perform various other activities, as described herein.

Provided herein is a method for processing a transaction, in accordance with principles of the disclosure. The transaction may be divided among a plurality of transactors.

The method may utilize a computer processor and one or more non-transitory computer-readable media storing computer executable instructions. The instructions, when executed by the computer processor, may generate an MPQR code. The instructions may access an MPQR code. The instructions may monitor the payment status of a first transactor and a second transactor. The first and second transactor may be selected from among a plurality of transactors. The instructions may monitor the payment status of all the transactors. The instructions may monitor the payment status of a first payer and a second payer. The first and second payer may be selected from among a plurality of payers. The instructions may monitor the payment status of all the payers.

The method may include generating the MPQR code in association with a total transaction amount. The method may include generating the MPQR code in association with a transaction. The method may include generating the MPQR code in association with a payment request by a merchant. The transaction amount may be input by the merchant. The code may be a dynamic code.

The method may include associating the MPQR code with a total transaction amount. The method may include associating the MPQR code with a transaction. The method may include associating the MPQR code with a payment request by a merchant. The transaction amount may be input by the merchant. The code may be a static code.

The method may include enumerating the payers of a split payment. The number of payers may be referred to herein as the split number.

The method may include assigning a split payment amount to each transactor. The method may include assigning a payment sub-portion to each transactor. The payment may be equally split among the payers. The payment amounts may be unequal. The split payment amounts may be each input by the respective payer. The split payment amounts may be input by the merchant. The split payment amounts may be automatically computed by the processor. The processor may calculate the payment amounts by dividing the total amount by the split number.

The method may include displaying the MPQR code in a scannable location. The location may be at the place of business of the merchant. The location may be a website of the merchant. The location may be on a sign located within the merchant's premises. The location may be on an invoice. The location may be amenable to simultaneous scanning by multiple mobile devices.

The method may include scanning the MPQR code by a mobile computing device of each of the first and second transactors. The mobile computing devices may be associated with each of the transactors. The method may include scanning the MPQR code by a mobile computing device of a plurality of transactors. The mobile computing devices may be associated with each of the transactors.

The method may include generating a unique, personalized visual representation of the MPQR code for each transactor. Each personalized visual representation may include a plurality of MPQR code sub-portions. Each personalized visual representation may include a first MPQR code sub-portion unique to a first transactor and a second MPQR code sub-portion unique to a second transactor. Each visual representation may include a sub-portion assigned to each payer. Each personalized visual representation may include as many sub-portions as the number of transactors. Each personalized visual representation may include as many sub-portions as the split number.

The method may include displaying the personalized visual representation of each transactor (payer) on their mobile computing device. The visual representation may include a hyperlink to that transactor's payment processing site. The hyperlink may be an embedded hyperlink. Upon selecting the hyperlink, the processor may redirect the display to the payer's payment processing site.

The method may include debiting the payment portions from each of the first and second transactors. The method may include debiting the payment portion from a banking app of each of the first and second transactors. The method may include debiting the payment portion from each payer. The terms payment portion and split payment may be used interchangeably herein.

The method may include holding in escrow the split payments of each of the first and second transactors. The payments may be held until the transactors collectively remit the total transaction amount. The payments may be held until the transactors collectively satisfy the total transaction amount. The payments may be held until every payer has remitted their split payment.

When the transactors have collectively remitted the total transaction amount, the split payments of the first and second transactors may be transferred to the merchant. The method may include transferring the split payments of the first and second transactors to the merchant, after the transactors have collectively remitted the total transaction amount. The method may include transferring the split payments of the first and second transactors to the merchant, after the transactors have collectively satisfied the total transaction amount. The method may include transferring the split payments of the first and second transactors to the merchant, after every payer has remitted their split payment.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 6 a schematic depiction of a system for processing split transactions.

FIG. 7 is a schematic depiction of a payment processing system.

DETAILED DESCRIPTION OF THE DISCLOSURE

Figure 1:
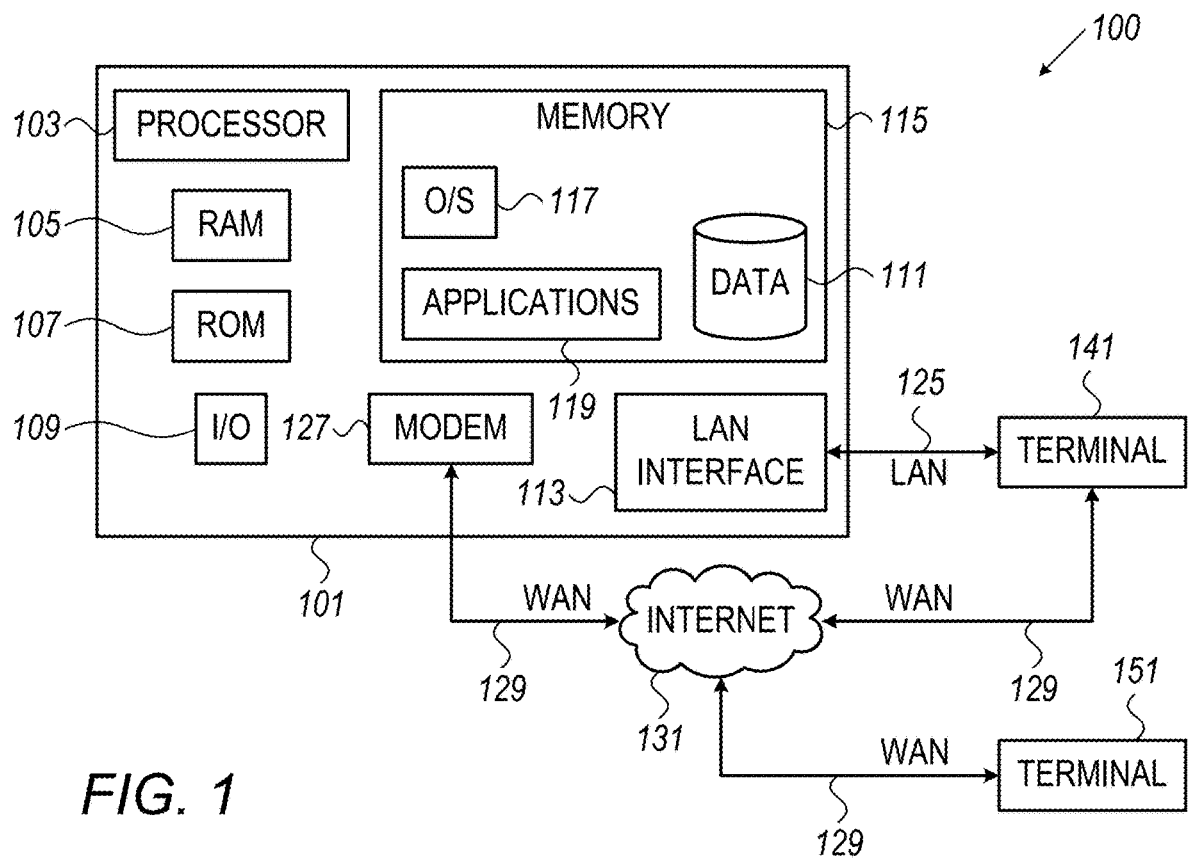
FIG. 1 shows an illustrative system in accordance with principles of the disclosure.

A method in accordance with principles of the disclosure may facilitate processing of split payments.

Embodiments of the system, as described herein, leverage processors, automated graphical mobile user interfaces, and/or other complex, specific-use computer systems to provide a novel approach for processing of split payments of merchant invoices.

As such, aspects of the present disclosure provide a technical solution to a technical problem of processing split payments in a seamless and efficient manner.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically generate a merchant presented quick response (MPQR) code. The code may be a dynamic code. The instructions, when executed by the computer processor, may automatically access an MPQR code. The code may be a static code.

Provided herein is a method for processing a transaction, in accordance with principles of the disclosure. The transaction may be divided among a plurality of transactors. The transaction may be a payment request presented by a merchant. Such transactions may be referred to as merchant transactions.

The method may utilize a computer processor and one or more non-transitory computer-readable media storing computer executable instructions. The instructions, when executed by the computer processor, may generate an MPQR code. The instructions may access an MPQR code. The instructions may monitor the payment status of a first transactor and a second transactor. The first and second transactor may be selected from among a plurality of transactors. The instructions may monitor the payment status of all the transactors. The instructions may monitor the payment status of a first payer and a second payer. The first and second payer may be selected from among a plurality of payers. The instructions may monitor the payment status of all the payers. The terms transactor and payer may be used interchangeably herein. The terms transactor and buyer may be used interchangeably herein.

The payment status of a party, as used herein, may refer to whether the party has remitted payment. The term may also encompass the amount remitted. The term may also encompass whether a request for payment was approved by a banking app associated with the party.

The method may include generating the MPQR code in association with a total transaction amount. The method may include generating the MPQR code in association with a transaction. The method may include generating the MPQR code in association with a payment request by a merchant. The transaction amount may be input by the merchant. The code may be a dynamic code.

The method may include associating the MPQR code with a total transaction amount. The method may include associating the MPQR code with a transaction. The method may include associating the MPQR code with a payment request by a merchant. The transaction amount may be input by the merchant. The code may be a static code.

As used herein, a quick response (QR) code and/or MPQR code may refer to an image configured to be readable by a smartphone camera. The image may be scannable. The code may be an encoded dataset. The code may include black squares, dots (or pixels), and blanks. The code may include blanks and colored squares and dots. The dots/pixels and blanks may be in a square grid pattern. The grid may be at least 21 rows by 21 columns. The grid may be at most 177 rows by 177 columns. The grid may be between 21-177 rows and between 21-177 columns.

The patterns on the code may encode sets of numbers. The patterns on the code may encode sets of letters. The patterns on the code may encode sets of numbers and letters. The data may be alphanumeric. The data may be numeric. The data may be binary. White pixels may represent 0, and black pixels may represent 1.

Figure 3:
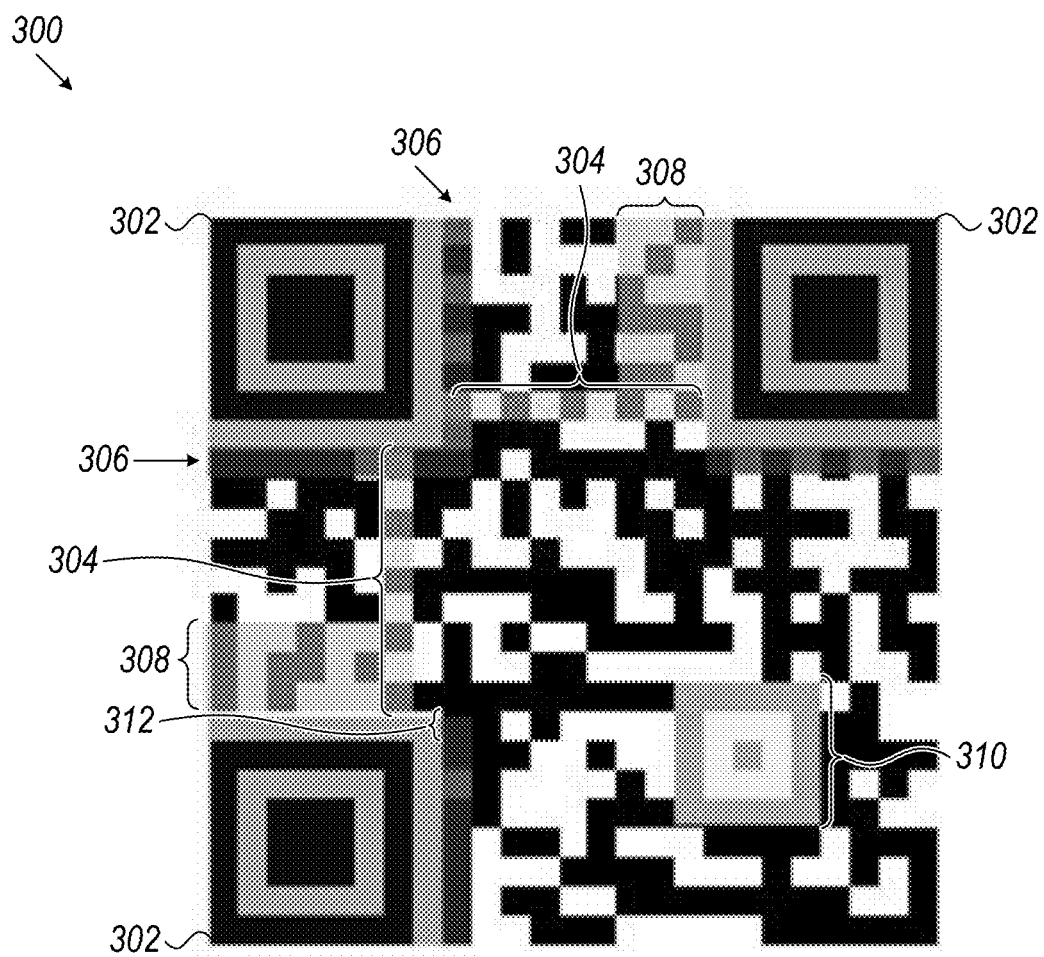
FIG. 3 depicts a prior art QR code.

The code may be generated with a QR code generator, which are widely available. The code may include regions that are customarily invariant. The areas may be as depicted in FIG. 3. The code may include three corner squares. The corner squares may serve as position markers. The code may include two timing patterns. The code may include 4-6 separators. The code may include two version information areas. The code may include an alignment pattern. The code may include a dark module. The remaining areas of the code may be grouped into modules of eight pixels each.

An MPQR code described herein may be a Mastercard® merchant presented QR (MPQR) code. The code may have been generated by a merchant bank. The code may be scannable by a consumer. The consumer may have a consumer bank application on their mobile computing device. The consumer bank application may include MPQR code scanning functionality. The code may be presented on a website of the merchant. The code may be presented on a sign located within the merchant's premises. The code may be presented on an invoice. The code may be presented on a ticket machine. The described merchant may be offering an item or service for sale. The terms merchant and seller may be used interchangeably herein.

The MPQR code may be a static code. The code may be used for all payments made to that merchant. The merchant may be prompted to enter the total payment amount before the code is presented to the transactors. After scanning the code, the consumer may be prompted to enter the total payment amount on their mobile device.

The MPQR code may be a dynamic code. The code may be custom generated for each payment. The merchant may be prompted to enter the total amount before the code is generated. After scanning the code, the total amount may appear on the consumer's mobile device. The customer may be prompted to confirm the total payment amount on their mobile device.

The method may include enumerating the payers of a split payment. The number of payers may be referred to herein as the split number.

The split number may be input or entered into the processor. The split number may be input or entered by the merchant. The split number may be input or entered by a consumer, after the consumer scans the code on their mobile device. The split number may be automatically generated by the processor. The processor may enumerate the number of devices that scan the code and define the split number to be the number of devices.

The method may include assigning a first split payment amount to the first transactor and a second split payment amount to the second transactor. The method may include assigning a first payment sub-portion to the first transactor and a second payment sub-portion to the second transactor. The first and second split payment amounts may be equal. The amounts may be unequal. The first and second split payment amounts may be each input by the respective payer, for example in the case of unequal payment amounts. The first and second split payment amounts may be input by the merchant. The first and second split payment amounts may be automatically computed by the processor. The processor may calculate the payment amounts by dividing the total amount by the split number, for example in the case of equal payment amounts.

The method may include assigning a split payment amount to each transactor. The method may include assigning a payment sub-portion to each transactor. The split payment amounts may be equal. The amounts may be unequal. The split payment amounts may be each input by the respective payer, for example in the case of unequal payment amounts. The split payment amounts may be input by the merchant. The split payment amounts may be automatically computed by the processor. The processor may calculate the payment amounts by dividing the total amount by the split number, for example in the case of equal payment amounts. The merchant may be prompted to enter the split payment amounts. In some embodiments, an option to enter a payment share may be presented together with the representation of the MPQR code on the screen of each payer. Personalized and/or altered representations of the MPQR code are described in more detail hereinbelow.

In some embodiments, when split payment amounts are input by each payer, the method may include the processor calculating the total committed amount. In some embodiments, the method may include the processor displaying the total committed amount on the mobile computing devices of the transactors. In some embodiments, the method may include the processor displaying the total committed amount on a computing device of the merchant. In some embodiments, the method may include the processor displaying the total committed amount on the mobile computing devices of the transactors and on a computing device of the merchant.

In some embodiments, the method may include presenting the first and second transactors with an option to supplement their split payment amount. In some embodiments, the method may include presenting all the transactors with an option to supplement their split payment amount. In some embodiments, this option may be presented when the total committed amount is less than the total transaction amount.

In some embodiments, the method may include displaying the total remitted amount on the mobile computing devices of the transactors. In some embodiments, the method may include displaying the total remitted amount on a computing device of the merchant. In some embodiments, the method may include displaying the total remitted amount on the mobile computing devices of the transactors and on a computing device of the merchant.

In some embodiments, the method may include presenting the first and second transactors with an option to supplement their split payment amount. In some embodiments, the method may include presenting all the transactors with an option to supplement their split payment amount. In some embodiments, this option may be presented when the total remitted amount is less than the total transaction amount.

The method may include assigning a split payment amount to each payer. The method may include assigning a payment sub-portion to each payer. The method may include assigning a split payment amount to each individual that has scanned the MPQR code. The split payment amounts may all be equal. In some embodiments, the amounts may not all be equal.

The method may include displaying the MPQR code in a scannable location. The location may be at the place of business of the merchant. The location may be a website of the merchant. The location may be on a sign located within the merchant's premises. The location may be on an invoice.

The method may include scanning the MPQR code by a mobile computing device of each of the first and second transactors. The mobile computing devices may be associated with each of the transactors. The method may include scanning the MPQR code by a mobile computing device of a plurality of transactors. The mobile computing devices may be associated with each of the transactors.

The method may include generating a unique, personalized visual representation of the MPQR code for each of the first and second transactors. Each personalized visual representation may include a plurality of MPQR code sub-portions. Each personalized visual representation may include a first MPQR code sub-portion unique to the first transactor and a second MPQR code sub-portion unique to the second transactor. Each visual representation may include a sub-portion assigned to each payer. Each personalized visual representation may include as many sub-portions as the number of transactors. Each personalized visual representation may include as many sub-portions as the split number. Each individual who scanned the MPQR code may be considered a transactor. Each individual who scanned the MPQR code and confirmed willingness to pay at least part of the transaction may be considered a transactor.

The described personalized visual presentations may be displayed using an automated graphical mobile user interface.

Each personalized visual representation may include demarcations, the demarcations delineating a sub-portion assigned to each payer. The first and second code sub-portions may be displayed in a pattern consistent across the visual representations. All the sub-portions may be displayed in a pattern consistent across the personalized visual representations.

In the personalized visual representation of the first transactor, the first MPQR code sub-portion may obscure at least a portion of the second MPQR code sub-portion. The first MPQR code sub-portion may obscure the second MPQR code sub-portion. The second MPQR code sub-portion may be obscured to the point of being unscannable. The first MPQR code sub-portion may be featured more prominently than the second MPQR code sub-portion. The first and second MPQR code sub-portion may be displayed in black and grayscale, respectively. The first and second MPQR code sub-portion may be displayed as active and inactive portions, respectively. The second MPQR code sub-portion may be blurred.

In the personalized visual representation of the second transactor, the second MPQR code sub-portion may obscure at least a portion of the first MPQR code sub-portion. The second MPQR code sub-portion may obscure the first MPQR code sub-portion. The first MPQR code sub-portion may be obscured to the point of being unscannable. The second MPQR code sub-portion may be featured more prominently than the first MPQR code sub-portion. The second and first MPQR code sub-portion may be displayed in black and grayscale, respectively. The first MPQR code sub-portion may be blurred.

In some embodiments, the personalized visual representation of each transactor includes an MPQR code sub-portion designated for that transactor. The designated code sub-portion may obscure at least a portion of the other MPQR code sub-portions. The designated code sub-portion may obscure the other MPQR code sub-portions. The other MPQR code sub-portions may be obscured to the point of being unscannable. The designated MPQR code sub-portion may be featured more prominently than the other MPQR code sub-portions. The designated and other MPQR code sub-portion may be displayed in black and grayscale, respectively. The other MPQR code sub-portions may be blurred. The designated and other MPQR code sub-portion may be displayed as active and inactive code portions, respectively.

It will be appreciated that reference herein to black and grayscale may refer to shades of light intensity of a particular pixel. Each pixel may have a value between 0 and 255, where zero corresponds to black, and 255 corresponds to white. The values between 0 and 255 may represent varying shades of gray, where values closer to 0 are darker and values closer to 255 are lighter. Reference herein to black may refer to pixels having a value below 50. Reference herein to grayscale may refer to pixels having a value above 100. Reference herein to grayscale may refer to pixels having a value between 100-200. Reference herein to grayscale may refer to pixels having a value between 150-200. Sub-portions of an MPQR code displayed in black may have a value at least 50 lower than the sub-portions displayed in grayscale.

In some embodiments, each personalized visual representation includes a plurality of MPQR code sub-portions, in which each sub-portion is unique to one of the plurality of transactors. The sub-portions may be equal in number to the plurality of transactors. The arrangement of the sub-portions may be consistent among the personalized visual representations.

In some embodiments, the method may include displaying the personalized visual representations of the first and second transactor on a screen of the merchant. Each visual representation may be associated with an indicator of the payment status of the transactor. The screen may be a screen of a computing device of the merchant.

In some embodiments, the method may include displaying the personalized visual representations of the first and second transactor on the mobile computing devices, each visual representation being associated with an indicator of the payment status of the transactor. The mobile devices may be the devices of the first and second payer. The devices may be the devices of each of the payers.

In some embodiments, the method may include displaying identifiers of the first and second transactors in association with the first and second MPQR code sub-portions, respectively. The identifiers may be displayed in proximity to the respective code sub-portions. In some embodiments, the method may include displaying identifiers of each transactor in association with their code sub-portion. The identifiers may be displayed on the screens of the transactors. The identifiers may be displayed on the merchant's screen. The identifiers may be displayed on the screens of the transactors and the merchant's screen. The identifier of each transactor may be the transactor's name. The identifier may be the transactor's nickname. The identifier may be the transactor's telephone number. The identifier may be a portion of the transactor's telephone number. The identifier may be a portion of the transactor's payment card (e.g., credit or debit card) number. The identifier may be the last 3 or 4 digits of the transactor's telephone number. The identifiers may be displayed on the personalized visual representations. The identifier of each transactor may be displayed in association with an indicator of the payment status of that transactor. The merchant may be prompted to enter an identifier of each payer.

In some embodiments, the method may include displaying the split payment amounts of the first and second transactors in association with the first and second MPQR code sub-portions, respectively. The amounts may be displayed in proximity to the respective code sub-portions. In some embodiments, the method may include displaying the split payment amounts of each transactor in association with their sub-portion. The amounts may be displayed on the screens of the transactors. The amounts may be displayed on the merchant's screen. The amounts may be displayed on the screens of the transactors and the merchant's screen. The amounts may be displayed on the personalized visual representations. The amount owed by each transactor may be displayed in association with an indicator of the transactor's payment status.

The method may include generating a unique, personalized payment processing site for each of the first and second transactors. The method may include generating a unique, personalized payment processing site for each payer. The payment processing sites may be in communication with the processor.

The payment processing site of the first transactor may display the first split payment amount. The payment processing site of the first transactor may input an authorization to debit the first split payment amount.

The payment processing site of the second transactor may display the second split payment amount. The payment processing site of the second transactor may input an authorization to debit the second split payment amount. The first and second split payment amounts may be the same as each other. The first and second split payment amounts may differ from one other.

The payment processing site of each payer may display the split payment amount of that payer. The payment processing site of each payer may input an authorization to debit the split payment amount of that payer.

The method may include displaying the personalized visual representation of the first transactor on the first transactor's mobile computing device. The representation may be displayed on the screen of the device. The representation may be displayed on the user interface of the device. The representation may be displayed in association with a hyperlink to the first transactor's payment processing site. The first payer's visual representation may include a hyperlink to the first transactor's payment processing site. The hyperlink may be an embedded hyperlink. Upon selecting the hyperlink, the processor may automatically redirect the display to the first payer's payment processing site. Upon clicking on the hyperlink, the processor may direct the device's interface to display the first payer's payment processing site. The redirection may occur upon hovering over the hyperlink.

The method may include displaying the personalized visual representation of the second transactor on the second transactor's mobile computing device. The representation may be displayed on the screen of the device. The representation may be displayed on the user interface of the device. The representation may be displayed in association with a hyperlink to the second transactor's payment processing site. The second payer's visual representation may include a hyperlink to the second transactor's payment processing site. The hyperlink may be an embedded hyperlink. Upon selecting the hyperlink, the processor may redirect the display to the second payer's payment processing site. Upon clicking on the hyperlink, the processor may direct the device's interface to display the second payer's payment processing site. Upon hovering over the hyperlink, the processor may direct the interface to the second payer's payment processing site.

The method may include displaying the personalized visual representation of each transactor (payer) on their mobile computing device. The representation may be displayed on the screen of the device. The representation may be displayed on the user interface of the device. The representation may be displayed in association with a hyperlink to the transactor's payment processing site. The visual representation may include a hyperlink to that transactor's payment processing site. The hyperlink may be an embedded hyperlink. Upon selecting the hyperlink, the processor may redirect the display to the payer's payment processing site. Upon clicking on the hyperlink, the processor may direct the device's interface to display the payer's payment processing site. Upon hovering over the hyperlink, the processor may direct the interface to the payer's payment processing site.

The method may include debiting the split payment from each of the first and second transactors. The method may include debiting the split payment from a banking app of each of the first and second transactors. The method may include debiting the split payment from each payer. The method may include debiting the split payment from a banking app of each payer. The debiting may utilize each payer's mobile device. The split payment amounts may be equal to each other. The split payment amounts may be unequal.

The method may include submitting a funding application programming interface (API) Request to secure the funds from the issuing bank holding the transactor's account. The method may include the consumer bank sending a Payment API Request to a broker or mediating institution. The broker or mediating institution may be a digital wallet provider. Non-limiting examples are Mastercard® for Masterpass® QR solution and Visa® for mVisa™ mobile payments.

The method may include holding in escrow the split payments of each of the first and second transactors. The payments may be held until the transactors collectively remit the total transaction amount. The payments may be held until the transactors collectively satisfy the total transaction amount. The payments may be held until every payer has remitted their split payment.

When the transactors have collectively remitted the total transaction amount, the split payments of the first and second transactors may be transferred to the merchant. In some embodiments, the split payments may be transferred to the merchant bank. The method may include transferring the split payments of the first and second transactors to the merchant, after the transactors have collectively remitted the total transaction amount. The method may include transferring the split payments of the first and second transactors to the merchant, after the transactors have collectively satisfied the total transaction amount. The method may include transferring the split payments of the first and second transactors to the merchant, after every payer has remitted their split payment. The transfer may be automatic.

When the transactors have collectively remitted the total transaction amount, the split payments of all the transactors may be transferred to the merchant. In some embodiments, the split payments may be transferred to the merchant bank. The method may include transferring the split payments of all the transactors to the merchant, after the transactors have collectively remitted the total transaction amount. The method may include transferring the split payments of all the transactors to the merchant, after the transactors have collectively satisfied the total transaction amount. The method may include transferring the split payments of all the transactors to the merchant, after every payer has remitted their split payment. The transfer may be automatic.

In some embodiments, when the transactors do not collectively remit the total transaction amount within a specified time period, the transaction may fail. In some embodiments, when the transactors do not collectively remit the total transaction amount within a specified time period, the processor may be configured to fail the transaction. The time period may be between 1-5 minutes. The time period may be between 1-2 minutes. The time period may be between 30-60 sections. The time period may be between 30 sections and 2 minutes. In some embodiments, when the transaction fails, the funds may be returned from escrow to the payers. In some embodiments, the described method prevents funds from being finally deducted from the account of individual payers, until all payers have demonstrated their willingness and ability to satisfy their share of the liability.

In some embodiments, the described processor may be housed in the merchant's computer network. In some embodiments, the processor may be housed in the edge layer of the merchant's computer network.

In some embodiments, the method may include generating a general altered visual representation of the MPQR code. In some embodiments, the general visual representation may include the described first and second MPQR code sub-portions. In some embodiments, the general visual representation may include demarcations, the demarcations delineating the first and second sub-portions. In some embodiments, the general visual representation may include a plurality of code sub-portions, with one sub-portion assigned to each payer. The number of sub-portions may correspond to the split number. In some embodiments, the general visual representation may include demarcations, the demarcations delineating the sub-portions.

In some embodiments, the general visual representation is the version of the MPQR code that is initially scanned by the transactors.

The described general altered visual presentations may be displayed using an automated graphical mobile user interface.

The general altered visual representation may include the first and second MPQR code sub-portions. The first and second code sub-portions may be displayed equally prominently. The general altered visual representation may display the first and second code sub-portions such that neither sub-portion is obscured.

In some embodiments, the described method includes displaying the general altered visual representation on a screen of the merchant. In some embodiments, the described method includes displaying the general altered visual representation on a screen of a representative of the merchant. The display may indicate the payment status of each transactor.

In some embodiments, the method may include displaying identifiers of the first and second transactors in association with the first and second MPQR code sub-portions, respectively. In some embodiments, the method may include displaying identifiers of each transactor in association with their code sub-portion. The identifier of each transactor may be the transactor's name. The identifier may be the transactor's nickname. The identifier may be the transactor's telephone number. The identifier may be a portion of the transactor's telephone number. The identifier may be the last 3 or 4 digits of the transactor's telephone number. The identifiers may be displayed on the general altered visual representation. The identifier of each transactor may be displayed in association with an indicator of the payment status of that transactor.

In some embodiments, the method may include displaying the split payment amounts of the first and second transactors in association with the first and second MPQR code sub-portions, respectively. In some embodiments, the method may include displaying the split payment amounts of each transactor in association with their sub-portion. The amounts may be displayed on the general altered visual representation. The amount owed by each transactor may be displayed in association with an indicator of the transactor's payment status.

Also provided herein is a multi-part QR code that is scannable by a mobile device, in accordance with the principles of this disclosure. Also provided herein is use of a multi-part QR code for visually displaying a split payment to a group of payers. The QR code may have any of the features described herein. The use may have any of the method features described herein.

A system is provided herein for automatically processing a split payment, in accordance with the principles of this disclosure. The system may include a processor configured to generate an MPQR code. The processor may be housed in an edge layer of the merchant's network. The processor may have a merchant interface that prompts the merchant to enter the total payment amount. The merchant interface may prompt the merchant to enter the number of payers. The payment shares may be equal. The payment shares may be unequal. The merchant may be prompted to enter an identifier for each payer. The merchant may be prompted to enter the payment share of each payer, if the shares are unequal.

The processor may be configured to divide the MPQR code into sections. A unique section of the MPQR code representing a payment share may be assigned to each payer.

The processor may be configured to generate altered visual representations of the MPQR code. There may be a unique altered version for each payer. Each altered version may display more prominently the section assigned to that payer. The number of sections may correspond to the number of payers. The altered versions may be displayed on the screen of each payer, after the payer scans the original MPQR code.

The processor may be configured to display an altered representation of the MPQR code on the screen of each payer. In the altered representation, the unique section of the MPQR code of each payer may appear as active, and the remainder of the MPQR code may appear as inactive. The altered representation of the MPQR code of each payer may display the section of that payer more prominently than the remainder of the MPQR code. The altered representation of each payer may display the identifier of that payer. The identifier may be displayed in proximity to the unique section of the player.

Each MPQR code may be configured to be selectable by the relevant payer. The payer may select the MPQR code using the same device used to scan the code.

The processor may be configured to automatically redirect the payer to a payment processing site upon selecting the altered MPQR code. The payment processing site may be configured to automatically display to each payer their payment share. The payment processing site may be configured to process each payer's payments share.

The processor may be configured to automatically display on a screen or interface a visual representation of the MPQR code. The sections of each payer may appear more prominently after that payer has satisfied their share of the liability. The sections of each payer may appear in association with an identifier of the payer and/or the amount owed by that payer. Adjustments to the visual representation may occur in real time.

The processor may be configured to automatically display on a merchant screen or interface the altered representations of each payer. The processor may be configured to indicate in real time whether each payer has satisfied their share of the liability.

The processor may be configured to hold in escrow funds submitted by individual payers until the processor receives an indication that each payer has submitted a payment request, and the payment requests of each payer have cleared. Funds submitted by individual payers may be held in escrow until the payments of all the payers are processed and cleared by processor.

The processor may be configured to transfer payment to the merchant account, after the payment requests of each payer have cleared. This transfer may be automatic. This transfer may require manual authorization by a representative of the merchant.

The processor may be configured to allocate a maximum time for the payment requests of each payer to be submitted and cleared. If all payment requests are not submitted and cleared within the allotted time, the payment request may be cancelled. Funds may be returned from escrow to the accounts of each payer that had successfully submitted their share of the liability.

QR code 420, 520, 620, and/or 720 may have one or more features in common with the QR code or MPQR described herein. Additionally, features of QR code described in connection with FIGS. 4-7 may be included in the smart glasses described herein.

The aforementioned processing device or computer processor may be a computer, as described in more detail in FIG. 1, optionally including any of the components and elements described for FIG. 1.

Figure 2:
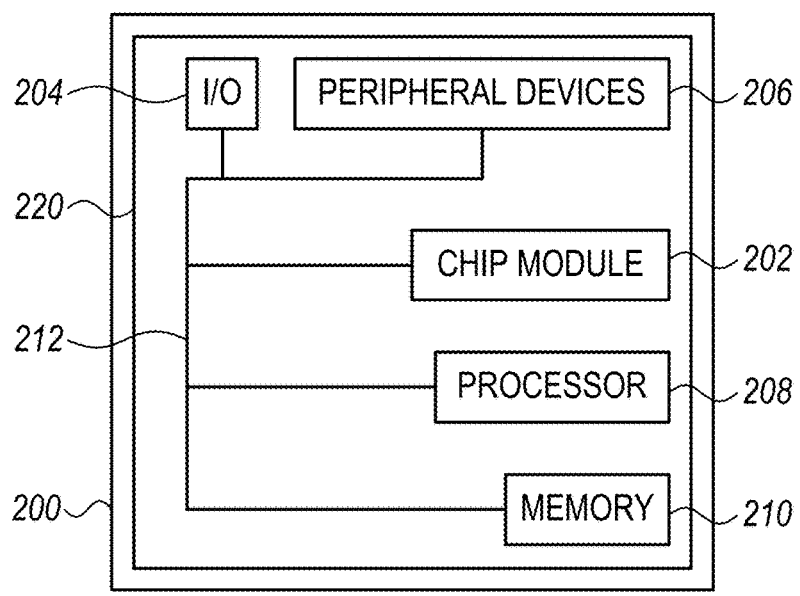
FIG. 2 shows an illustrative system in accordance with principles of the disclosure.

In some aspects, the processing device or computer processor may be a computer, as described in more detail in FIG. 2, optionally including any of the components and elements described for FIG. 2.

Apparatus and methods described herein are illustrative. Apparatuses and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatuses may omit features shown or described in connection with illustrative apparatuses. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

The methods described herein may utilize one or more computer systems and servers that include one or more of the following hardware components: Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory. The computer-readable instructions may include instructions to create, access, modify, and/or display an MPQR code.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions, such as creating, accessing, modifying, and/or displaying an MPQR code; embedding a hyperlink in a displayed MPQR code; and transmitting a payment transaction request to a banking institution.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered engines for the purposes of this application and with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations, for example creating, accessing, modifying, and/or displaying an MPQR code; embedding a hyperlink in a displayed MPQR code; and transmitting a payment transaction request to a banking institution.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

FIG. 3 depicts a prior art QR code 300. The code may include three corner squares 302. Corner squares 302 may serve as position markers. The code may include two timing patterns 304. The code may include 4-6 separators 306. The code may include two version information areas 308. The code may include an alignment pattern 310. The code may include a dark module 312.

Figure 4:
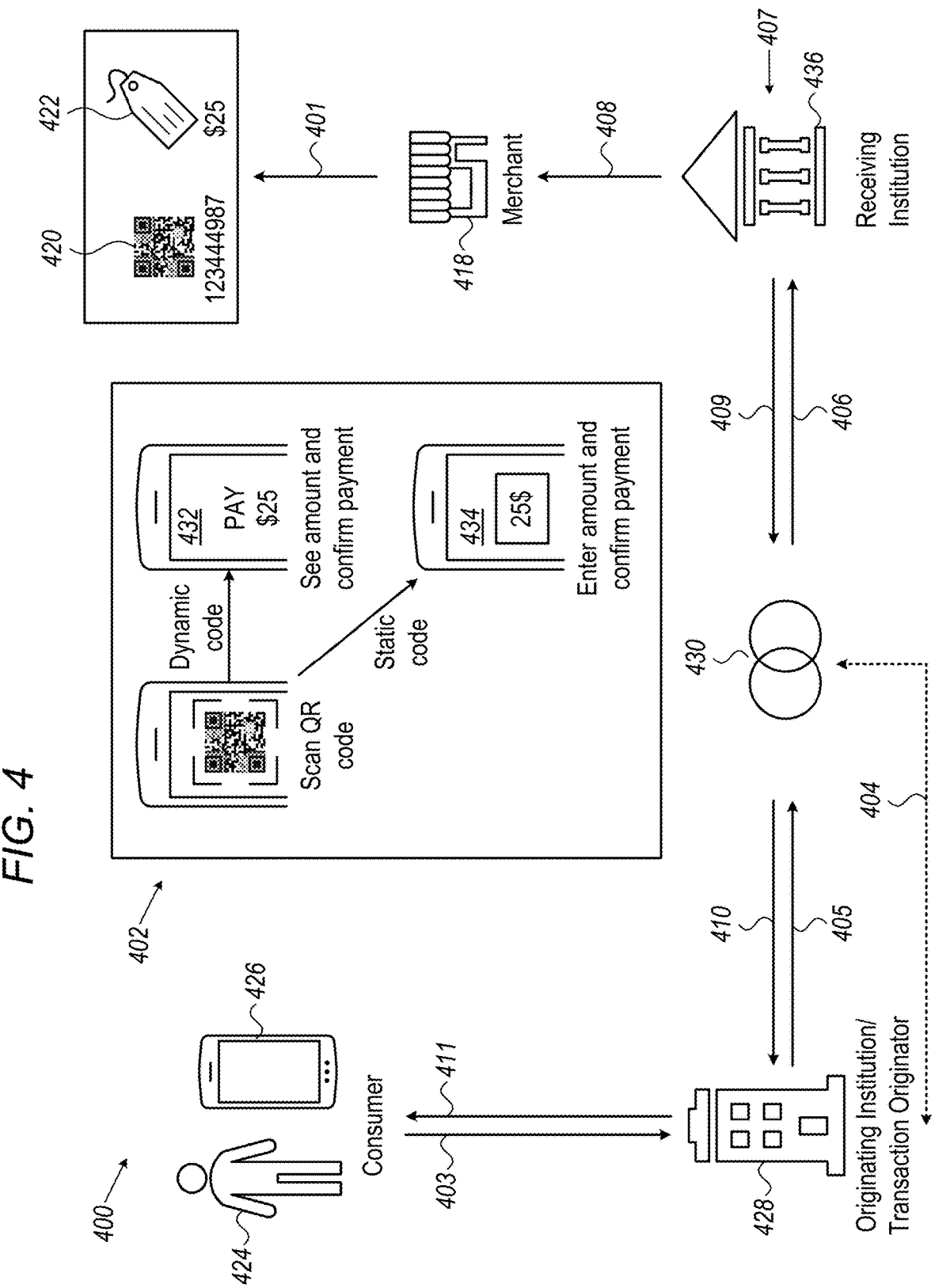
FIG. 4 depicts a prior art MPQR system.

FIG. 4 depicts a prior art MPQR system 400. In step 401, merchant 418 presents QR code 420 and transaction amount 422 to customer 424. QR code 420 may be a dynamic 432 or static 434 code. In step 402, using a payment app, the customer (sender) scans the QR code and confirms payment. The app parses and verifies the QR code. If the QR code is dynamic, the app displays the amount to the consumer for confirmation. If the code is static, the consumer enters the amount and confirms willingness to pay.

In step 403, a processor sends the data necessary to initiate an MPQR payment.

In optional step 404, the Originating Institution/Transaction Originator (consumer bank) 428 may verify that the funding is available. If the Originating Institution is the consumer's bank, it debits the consumer's account (Funding Account). Otherwise, it uses a Funding application programming interface (API) Request to secure the funds from the issuing bank holding the consumer's account.

In step 405, the Originating Institution/Transaction Originator 428 sends a Payment API Request to a broker or mediating institution 430.

In step 406, mediating institution 430 sends a Payment Transaction Request to the network to route to the Receiving Institution (Merchant Bank) 436 for approval.

In step 407, the Receiving Institution approves or declines the payment.

In step 408, if approved, the Receiving Institution credits the merchant's account (Receiving Account) and notifies them of the payment.

In step 409, the Receiving Institution sends a Payment Transaction Response to mediating institution 430.

In step 410, mediating institution 430 sends a Payment API Response to the Originating Institution/Transaction Originator.

In step 411, the Originating Institution/Transaction Originator notifies the consumer of the payment outcome via the payment app. If the MPQR Payment was rejected or declined, the Originating Institution/Transaction Originator must refund the Funding Account (if it's the consumer's bank) or create a Funding Reversal API Request to return the funds secured by the Funding Request (in Step 404).

Figure 5:
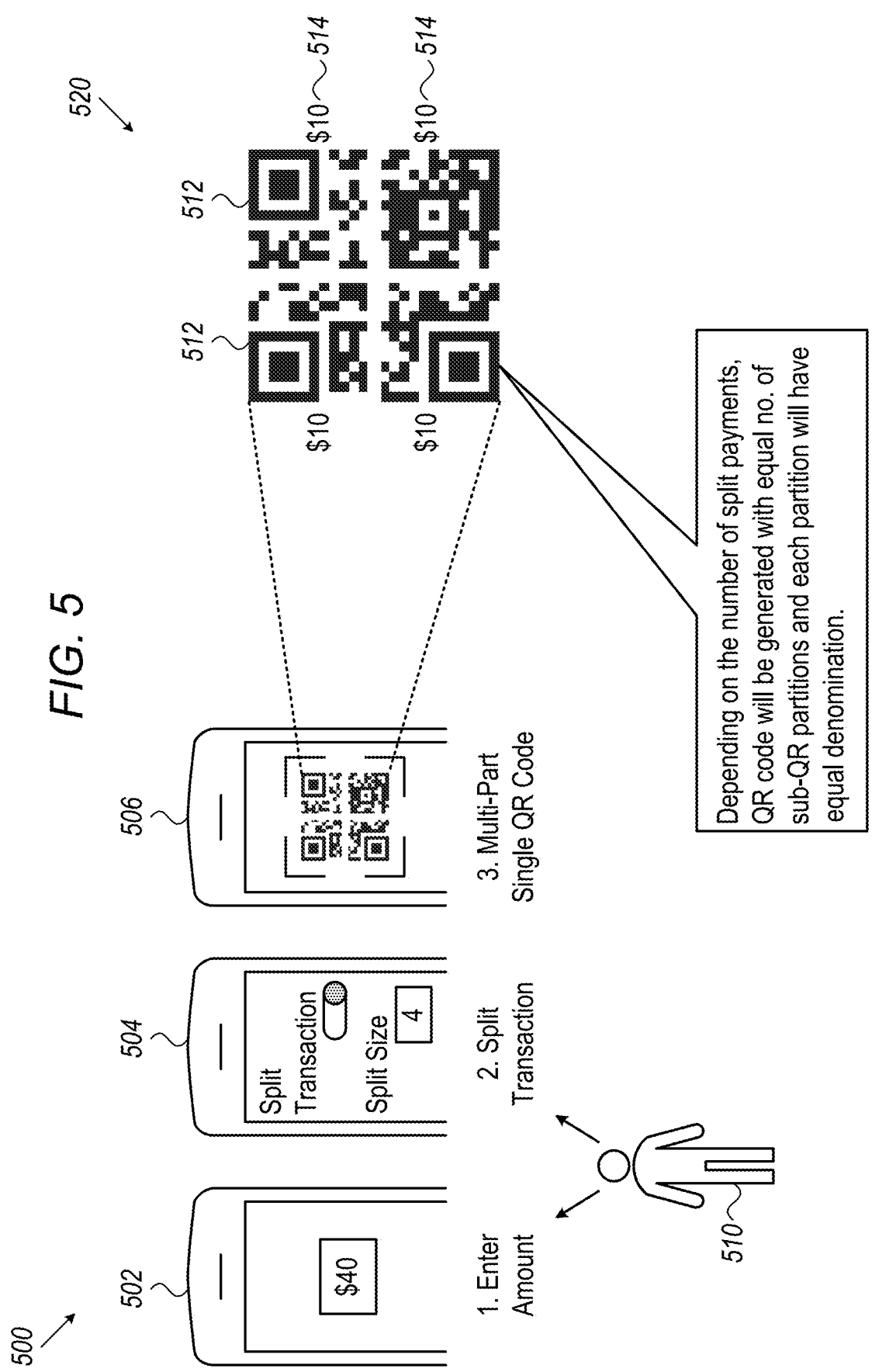
FIG. 5 schematically depicts a method for generating a multi-part single QR code.

FIG. 5 is a schematic depiction of a method 500 for generating a multi-part single QR code, in accordance with principles of the disclosure. At step 502, vendor 510 enters the transaction amount into a computing device. At step 504, vendor 510 enters the split number into the computing device. At step 506, a multi-part single QR code 520 is generated. The code may have a number of sub-partitions 512 equal to the split number. The code may display a denomination 514 next to each sub-partition.

FIG. 6 is a schematic depiction of a system 600 for displaying, tracking, and processing a split transaction, in accordance with principles of the disclosure. Merchant 610 may instruct a processor to display a general visual representation of a multi-part QR code 620 in a scannable location. Multi-part QR code 620 may be displayed in association with total transaction amount 614. A close-up view of multi-part QR code 620 on the right shows sub-partitions 613 and demarcations 625, which may serve to delineate sub-partitions 613. Multi-part QR code 620 may be displayed in association with payer identifiers 622. Personalized visual representations 618 of the MPQR code may be displayed on mobile devices 616 of the payers. Each personalized visual representation may display a sub-portion corresponding to the payer for which the representation is displayed, among other sub-portions corresponding to the other payers. The sub-portion may be displayed more prominently than the other sub-portions. The other sub-portions may be displayed in gray. The other sub-portions may be disable on the payer's device.

The merchant's screen may receive real-time updates on the scanning of multi-part QR code 620 by mobile devices 616. The merchant's screen may receive real-time updates on payment of split transaction amounts by the payers.

FIG. 7 is a schematic depiction of a payment processing system 700, in accordance with principles of the disclosure. Merchant 710 may instruct a processor to display a general visual representation of a multi-part QR code 720 in a scannable location. Personalized visual representations 718 of the MPQR code may be displayed on mobile devices 716 of the payers. Each personalized visual representation may display a sub-portion corresponding to the payer for which the representation is displayed, among other sub-portions corresponding to the other payers. Selecting an embedded hyperlink on a personalized visual representation 718 may cause a mobile device 716 to transmit a debit (payment) request to consumer bank 730. At step 702, processor 722 may ascertain whether all sub-payments from payers have been received during a predetermined time period. At step 704, when all sub-payments from payers not yet have been received, then the partially processed payment may be held in an uncommitted state. At step 706, when all sub-payments from payers have been received, then the total transaction amount may be transferred to merchant bank 724. At step 708, when all sub-payments from payers were not received during the time period, then the transaction may be failed.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random-access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, QR codes and associated methods, systems, apparatuses, and computer program products for processing split transactions are provided. Persons skilled in the art will appreciate that the present invention can be practiced by other than the described embodiments, which are presented for purposes of illustration rather than of limitation.

What is claimed is:

1. A method for processing a merchant transaction, wherein the transaction is divided among a plurality of transactors, the method utilizing a computer processor and one or more non-transitory computer-readable media storing computer executable instructions; wherein the instructions, when executed by the computer processor, generate or access a merchant presented quick response (MPQR) code and monitor a payment status of a first transactor and a second transactor, the method comprising:
   associating the MPQR code with a total transaction amount;
   enumerating the transactors, thereby generating a split number;
   inputting the split number into the processor;
   assigning a first split payment amount to the first transactor and a second split payment amount to the second transactor;
displaying the MPQR code in a scannable location;
   scanning the MPQR code by a mobile computing device of each of the first and second transactors;
   generating a unique, personalized visual representation of the MPQR code for each of the first and second transactors, wherein:
      each personalized visual representation comprises a first MPQR code sub-portion unique to the first transactor and a second MPQR code sub-portion unique to the second transactor, the first and second MPQR code sub-portions being displayed in a pattern consistent across the personalized visual representations;
      the first MPQR code sub-portion obscures at least a portion of the second MPQR code sub-portion in the personalized visual representation of the first transactor; and
      the second MPQR code sub-portion obscures at least a portion of the first MPQR code sub-portion in the personalized visual representation of the second transactor;
   generating a unique, personalized payment processing site for each of the first and second transactors, wherein the payment processing sites are in communication with the processor; and wherein:
      the payment processing site of the first transactor inputs authorization to debit the first split payment amount; and
      the payment processing site of the second transactor inputs authorization to debit the second split payment amount;
   displaying the personalized visual representation of the first transactor on the first transactor's mobile computing device and in association with a hyperlink to the first transactor's payment processing site; and
   displaying the second transactor's personalized visual representation on the second transactor's mobile computing device and in association with a hyperlink to the second transactor's payment processing site;
   debiting a payment portion from each of the first and second transactors;
   holding in escrow the payment portions of each of the first and second transactors until the plurality of transactors collectively remit the total transaction amount; and
   when the plurality of transactors collectively remit the total transaction amount, transferring the payment portion of each of the first and second transactors to the merchant.

2. The method of claim 1, wherein the processor is housed in an edge layer of a computer network of the merchant.

3. The method of claim 1, the method further comprising generating a general altered visual representation of the MPQR code, wherein:
   the general altered visual representation comprises the first and second MPQR code sub-portions; and the first and second MPQR code sub-portions are displayed equally prominently.

4. The method of claim 3, the method further comprising displaying on a screen of the merchant the general altered visual representation, together with indicators of the payment status of each transactor.

5. The method of claim 1, wherein each personalized visual representation comprises a plurality of MPQR code sub-portions, wherein each sub-portion is unique to one of the plurality of transactors; and the sub-portions are equal in number to the plurality of transactors.

6. The method of claim 1, wherein the first and second split payment amounts are equal.

7. The method of claim 1, wherein the first and second split payment amounts are not equal.

8. The method of claim 1, wherein the first split payment amount is input by the first transactor, and the second split payment amount is input by the second transactor.

9. The method of claim 8, the method further comprising displaying a total committed amount on the mobile computing devices of the transactors or on a computing device of the merchant.

10. The method of claim 9, the method further comprising presenting the first and second transactors with an option to supplement their split payment amount, the option being presented when the total committed amount is less than the total transaction amount.

11. The method of claim 8, the method further comprising displaying a total remitted amount on the mobile computing devices of the transactors or on a computing device of the merchant.

12. The method of claim 11, the method further comprising presenting the first and second transactors with an option to supplement their split payment amount, the option being presented when the total remitted amount is less than the total transaction amount.

13. The method of claim 1, wherein the first and second split payment amounts are input by the merchant.

14. The method of claim 1, wherein the first and second split payment amounts are automatically computed by the processor.

15. The method of claim 1, wherein the split number is input by the merchant.

16. The method of claim 1, wherein the split number is automatically computed by the processor and is equal in number to the transactors.

17. The method of claim 1, the method further comprising displaying the personalized visual representations of the first and second transactor on a screen of the merchant, each visual representation being associated with an indicator of the payment status of the transactor.

18. The method of claim 1, the method further comprising displaying the personalized visual representations of the first and second transactor on the mobile computing devices, each visual representation being associated with an indicator of the payment status of the transactor.

19. The method of claim 1, the method further comprising displaying identifiers of the first and second transactors in association with the first and second MPQR code sub-portions, respectively.

20. The method of claim 1, the method further comprising displaying the first and second split payment amounts in association with the first and second MPQR code sub-portions, respectively.

* * * * *